United States Patent [19]
Mayer et al.

[11] Patent Number: 5,308,713
[45] Date of Patent: May 3, 1994

[54] PROCESS FOR THE REACTIVATING SEALED LIQUID ELECTROLYTE BATTERIES

[75] Inventors: William N. Mayer, White Bear Lake; Stephen D. Tuomela, Fridley, both of Minn.

[73] Assignee: Modern Controls, Inc., Minneapolis, Minn.

[21] Appl. No.: 24,151

[22] Filed: Feb. 26, 1993

[51] Int. Cl.$^5$ .......................................... H01M 10/42
[52] U.S. Cl. ...................................... 429/49; 429/72; 429/206
[58] Field of Search ................... 429/49, 72, 206

[56] References Cited

U.S. PATENT DOCUMENTS

| | | | |
|---|---|---|---|
| 3,945,846 | 3/1976 | Dey | 429/72 |
| 4,055,709 | 10/1977 | Medford | 429/49 |
| 4,182,028 | 1/1980 | Epstein et al. | 429/72 |
| 4,628,011 | 12/1986 | Feldman et al. | 429/49 |
| 4,680,241 | 7/1987 | Dyer | 429/49 |

FOREIGN PATENT DOCUMENTS 0124137   3/1919   United Kingdom ................ 429/49

OTHER PUBLICATIONS

Sales brochure, Gates Energy Products, Inc.
Article "How to Keep Rechargeables Rolling," *Machine Design* Aug. 10, 1989, pp. 87-93.
Article "Long-Life Electrolyte for Nickel/Hydrogen Cells," NASA Tech Briefs, Nov./Dec. 1987, p. 30.
Article "A Primer on Batteries," *EC&M Magazine*, Feb. 1991, p. 20.
Article "Battery Technology," *Radio-Electronics Magazine*, Jan. 1991, pp. 45-49, 83.

*Primary Examiner*—Kathryn Gorgos
*Attorney, Agent, or Firm*—Palmatier, Sjoquist & Helget

[57] ABSTRACT

A method for reactivating and recovering electrolyte cells by drilling a hole through the battery case and injecting a volume of electrolyte liquid into the case for absorption into the cell separator material. The battery is subjected to multiple charge/discharge cycles while the cell opening remains unsealed, and is subjected to a final charge prior to sealing the drilled hole through the cell outer case.

19 Claims, 2 Drawing Sheets

PROCESS FOR THE REACTIVATING SEALED LIQUID ELECTROLYTE BATTERIES

BACKGROUND OF THE INVENTION

The present invention relates to a process for recovering the recharge life cycle of sealed liquid electrolyte batteries. In particular, the invention relates to a method for recovering nickel-cadmium (Ni-Cd) cells which have degraded to the point where they no longer accept or are capable of holding a voltage charge. The preferred embodiment of the invention is directed to Ni-Cd batteries, but the principles of the invention are equally applicable to other sealed liquid electrolyte rechargeable batteries, such as nickel-metal-hydride, or rechargeable alkaline batteries.

All batteries contain an electrolyte of one form or another. The purpose is to provide a medium in which ions move freely from one electrode to another, thereby allowing current flow. Both the volume and strength of the electrolyte are important to the proper operation of the battery. As long as the electrolyte parameters stay within fairly wide limits, operation is not impaired, but if either the volume or strength of the electrolyte move outside of these fairly wide limits, the battery operation degrades. In a Ni-Cd battery and many other batteries, this electrolyte takes the form of a liquid solution of potassium hydroxide (KOH) which is soaked into the insulating material and in contact with the battery electrodes.

The invention is primarily concerned with rechargeable batteries of the general type which may be discharged at peak current drains up to 10-20 amps (A) but typically operate between 0.05 and 10 ampere hour (Ah) capacities. The charging of such batteries is typically accomplished at a charge rate of 0.1-1 amps. The charge and discharge rate of batteries is frequently referred to as the "C-rate," which is defined as the current flow out of or into a cell numerically equal to the cells rated capacity. For example, the C-rate of a 1-Ah cell is 1 A; the C-rate of a 2.5-Ah cell is 2.5 A. The C-rate concept is useful to enable a comparison of different size cells on the basis of a scaling of charge and discharge rates, for different cells behave similarly in terms of their voltage and operation time when they are charged or discharged at the same C-rate. The Ni-Cd batteries can operate with discharge rates up to 20 C, and are typically recharged at rates of 0.02 C-0.3 C.

A Ni-Cd battery is typically constructed of a tightly wrapped coil of materials consisting of a cadmium plate, a nickel plate and a porous insulating material separating the plates, which material is impregnated with an electrolyte solution such as KOH. The electrochemistry of a Ni-Cd cell determines its nominal operating voltage; for a Ni-Cd battery this nominal operating voltage is 1.2 volts. The cell chemistry causes the nominal voltage to "droop" during discharge, although the discharge voltage characteristics are quite flat over an extended operating time, and the "droop" becomes sudden and quite drastic after a predetermined operating time interval. After a Ni-Cd battery has been recharged, the voltage operating characteristic returns to its initial 1.2 volt nominal voltage, and the voltage operating curve is repeatable over many subsequent charge and recharge cycles. Commercially available Ni-Cd batteries are typically advertised to have an operating life of 300-500 recharge cycles.

It has long been suspected that the failure of such batteries is caused by a drying action, whereby the separator between the electrodes becomes dry as a result of loss of electrolyte. The mechanisms which cause such electrolyte loss are not as well known, although several theories have been urged to explain such loss. One such theory contends that the positive electrodes thicken with charging and recharging cycling, and positive active material moves toward the electrode plate surface and, in so doing, greatly reduces the pore size at the surface where contact is made with the separators. The capillary action of the exposed pores is thus increased, causing electrolyte to be drawn out of the separator more strongly than when the cell was new. At the same time, the expansion of the positive-plate electrode provides more void volume inside the plates where the absorbed electrolyte is trapped so that it cannot be recirculated.

Another theory holds that a certain volume of air or other gas is always included in the pores of the electrode plates when the cells are assembled, and, the volume occupied by the nitrogen in this air will eventually become occupied with electrolyte. Some fraction of this electrolyte is likely to come from the separator, thereby drying the separator material to the extent that this migration occurs.

Another and perhaps a better theory is that the charging and recharging of the battery results in the buildup of internal heat, depending to a large extent upon the magnitude of current passing between the electrodes. As the battery internal heat builds up, it increases the internal battery pressure, and this pressure exerts an outward force along all battery seals and, in particular, can be released by an internal pressure valve mechanism which is designed into the battery for that purpose. If the internal valve mechanism permits the release of gas under excess pressure, it will also permit the release of some electrolyte or electrolyte chemicals. Over a period of extended use, this amounts to a gradual reduction in the total electrolyte remaining inside the cell, which causes the drying of the separator material.

It may also be that the continued charging and discharging of the battery, and the heat and high internal pressures associated therewith, results in a buildup of gases along the interface between the battery plates and the separator material and into the surface of the battery plates, and this gaseous buildup reduces the efficiency of transfer of ions between the plates and the electrolyte-filled separator material. Under this scenario, the gaseous buildup may not necessarily be of sufficiently high pressure so as to release the internal battery pressure valve mechanism, but the accumulation may be sufficient to reduce the charging/discharging efficiency of the battery over time. As a gaseous buildup accumulates over time, the overall battery efficiency may degrade to the point where the battery is deemed to be no longer capable of accepting the charge, and is therefore discarded.

The battery recharge cycle is a particularly important factor in battery life, as the battery recharge current may cause a buildup of internal heat in the battery. Minimum commercial battery recharge rates are about C/20, i.e., requiring 20 hours to recharge a battery to its rated capacity. However, since the battery charging efficiency is under 100 percent, it is more typical to require 36-48 hours for recharging a battery to its rated capacity. Recharging efficiency decreases as the battery nears its full recharge. As the battery is recharged to within its final few percentage points of full capacity, the cell approaches an overcharge condition, and in this condition the cell generates gaseous oxygen $O_2$. If the recharge current rate is low, a continuous overcharge does not damage the battery since the cell can electro-chemically recombine the total oxygen volume. However, if the current recharge rate is high, and particularly over the recommended recharge limits, the internally-generated $O_2$ is expelled from the battery through the internal pressure valve mechanism. Repeated occurrences of this type causes water to dry from the electrolyte, thereby reducing the overall life expectancy of the battery. Market conditions encourage battery manufacturers to recommend faster recharge rates for their Ni-Cd batteries, and it is not uncommon for a manufacturer to recommend a "standard" charging rate of 0.2 C (16-20 hours), but also to provide recommendations for a "fast" charging rate of 1.0 C or higher, which may cause venting of internally-generated $O_2$. It is believed that commercially-available battery cells can sustain a continuous overcharge at up to about 0.33 C and still internally recombine 100 percent of the $O_2$ generated at this recharging rate.

A commercially-available Ni-Cd battery pack typically is an assembly of a multiplicity of Ni-Cd cells, usually connected electrically in series. This provides a predetermined battery-pack output voltage which is determined by the number of series-connected cells, and the battery capacity is determined by the respective sizes of each of the cells. However, cells of the same size and manufacture do exhibit actual capacities that differ, up to ±10%, from a mean value. When such cells are connected into a multi-cell capacity, these variations can cause some cells to give up the last of their usable capacity and other cells to retain a certain capacity upon discharge of the battery pack. If the extent of battery-pack discharge is deep enough, one or more cells may be brought to zero voltage, which can cause the condition known as cell reversal.

When cell reversal occurs the energy of the cell is expended to the point where any further current drain is into the cell rather than from the cell, and therefore the external circuits drive the cell instead of the reverse action. During cell reversal, the cell voltage can drop as low as −1.4 volts, which generates gaseous hydrogen ($H_2$), which does not recombine within the cell and must be vented through the cell internal pressure valve mechanism. This condition further contributes to the loss of water from the cell, and the ultimate drying of the electrolyte within the cell.

Ni-Cd batteries can further experience actual electrolyte leakage under certain conditions, particularly conditions wherein the battery is connected into a circuit where there is a very small amount of current drain over an extended period of time. For example, in a Ni-Cd battery connected into a radio which retains some small amount of current drain even when not being operated, a small amount of electrolyte may leak from the seals of the cell in an extended time period of from one week to several months. This is known as "creep" leakage, and usually can be identified upon inspection, as a white fuzz appearing around the top seal of the cell. Such a battery can usually be recharged, although the condition does contribute to the overall shortening of the battery life cycle.

Another factor which shortens the overall life of a Ni-Cd battery is the operating environment temperature. In general, for every 10° C. increase in the average temperature of operation of a Ni-Cd battery, the cell life is cut in half. This is thought to be caused by a loss of electrolyte in the cell, combined with the breakdown of the separator material which absorbs the electrolyte liquid, or an accumulation of gases which interferes with the charge/discharge process.

The foregoing and other causes eventually lead to spent batteries, wherein the batteries are no longer able to accept a recharge, and the spent batteries must then be disposed of in a suitable manner. This presents a particular problem for Ni-Cd batteries, because cadmium is considered to be a hazardous waste and, therefore, such batteries cannot be lawfully disposed of in the usual municipal waste stream. The batteries must, therefore, be recycled in a manner which permits the recovery of the cadmium, which can then be disposed of according to the rules for disposing hazardous wastes. Approximately, 300,000,000 nickel cadmium cells are purchased in the United States each year, with the number increasing each year, and therefore, the disposal of such cells presents a real and significant problem. It, therefore, would be highly advantageous if such cells could be recycled in a manner which regenerates the cell charge-accepting capacity, and permits the cell to be reused for a significant number of additional charge/discharge operating cycles.

SUMMARY OF THE INVENTION

The present invention comprises a method for recovering sealed liquid electrolyte batteries, particularly Ni-Cd batteries, wherein the energy storage capacity of the batteries may be restored, and the batteries may be reused through an extended operating life. The method involves a number of steps wherein electrolyte material is reintroduced into the cell through a small opening created in the exterior cell wall, the cell is stored for a predetermined time to permit the electrolyte to become fully absorbed into the cell, the cell is run through several charge/discharge cycles, culminating with a final charge to full voltage, and the exterior cell wall is sealed.

A principal object and advantage of the invention is to provide a method for recovering spent batteries, to permit the batteries to be replaced in service for an extended series of charge/discharge cycles.

DESCRIPTION OF THE PREFERRED EMBODIMENT

The present invention is described with reference to a particular type of Ni-Cd battery cell, but the principles of the invention are readily applied to sealed liquid electrolyte batteries of various types and capacities. The process described herein is related to a battery pack which is typically used in connection with cellular telephone equipment, wherein six Ni-Cd cells are connected in series to create the battery pack, and the battery pack has an initial rating of 7.5 volts DC, and 1400-1500 milliamp hour capacity. The several steps of the invention process may be applied to other Ni-Cd cells of differing capacity, or other types of sealed electrolyte batteries, after experimental adjustment of the various parameters disclosed herein.

Figure 1:
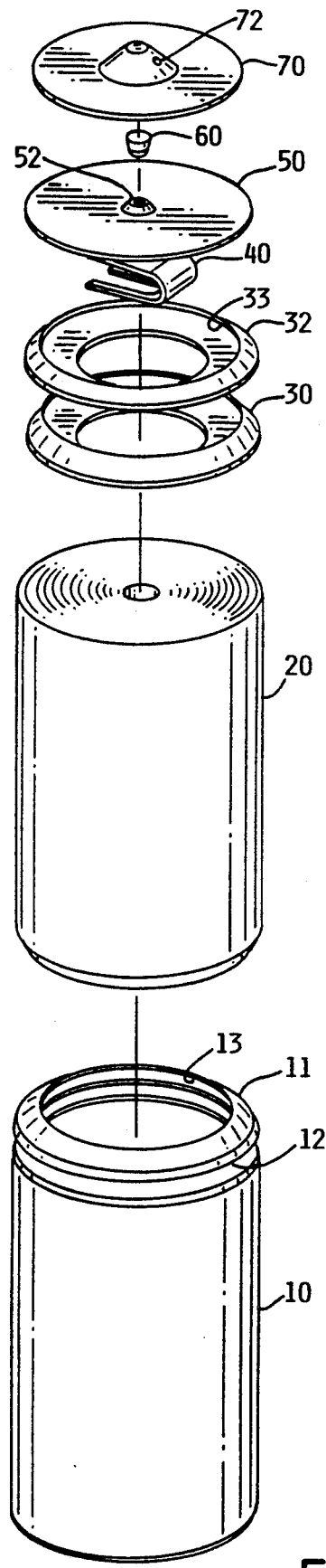
FIG. 1 shows an exploded view of a typical liquid electrolyte battery cell.

FIG. 1 shows a typical liquid electrolyte battery cell in exploded view. An outer case 10 may be made from nickel or nickel-plated steel. The inner cell electrodes 20 are in the form of a tightly-wound coil, consisting of an outer layer which forms a negative plate, a separator material and an inner layer which forms a positive plate. An insulating seal ring 30 is seated atop the interior electrode coil, and a second insulating ring 32 is positioned in spaced-apart relation above insulating ring 30. A spring clip 40 has a bottom surface which contacts against the upper edges of one of the layers of the coil 20, and an upper surface which is spring biased against a vent plate 50. Vent plate 50 has a central opening 52 therethrough, which is normally closed by a vent plug 60. A top cover 70 rests atop vent plug 60, and top cover 70, vent plug 60 and vent plate 50 are all compressed in the flange 33 of insulator 32. The outer case 10 is initially formed in a cylindrical shape, and the groove 12 and top flange 11 are formed after the other components have been inserted into the cell outer case. In their assembled position, insulating flange 30 is positioned beneath groove 12, and insulating flange 32 is positioned above groove 12 and within the interior channel 13 created by flange 11.

Figure 2:
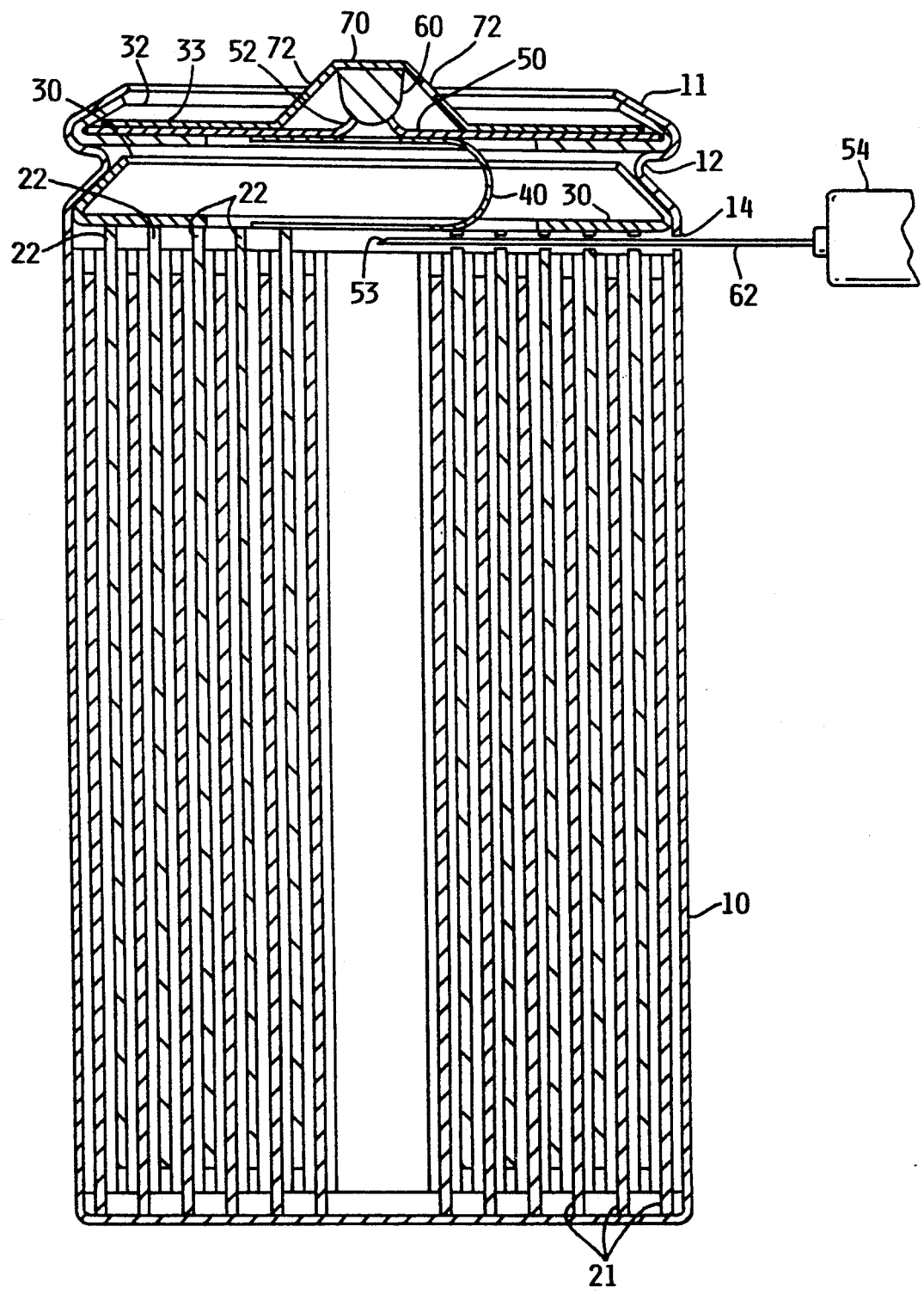
FIG. 2 shows an elevation cross-section view of a cell and one step of the recovery process.

FIG. 2 shows a typical cell of the type shown in FIG. 1 in elevation cross-section view, after all components have been properly assembled. FIG. 2 also shows one step of the process, wherein a hollow needle 62 is inserted through a drilled hole 14 in the sidewall of outer case 10. The hole 14 is extended through the sidewall of case 10 and also through the respective upwardly-projecting plates of the inner cell electrodes 20. Needle 62 has an open end 53 through which liquid may be ejected into the interior of the cell, and needle 62 is typically connected to a syringe 54 or other suitable liquid transfer device.

The interior cell is constructed so that one layer 21 of the interior electrodes is displaced laterally relative to the other layer 2 of the electrodes, so that the lower edges of electrode 21 project downwardly and into contact against the inside surface of the case 10, and the upper edges of the electrodes 22 project upwardly into the upper region of the case 10. A metallic spring clip 40 rests atop a plurality of the upper edges of electrode 22 and makes electrical contact therewith. Insulating ring 30 also rests atop some of the upper edges of electrode 22, but a central opening through insulating ring 30 permits spring clip 40 to make the necessary electrical contact with the electrode edges. The top surface of spring clip 40 is biased against the lower surface of vent plate 50, which is also constructed of a metallic conductor. Top cover 70 is also metallic, and top cover 70 rests atop vent plate 50; there is, therefore, electrical conductivity between the top edges of electrodes 22 to the top cover 70, via spring clip 40 and vent plate 50. Top cover 70, therefore, becomes the positive terminal of the cell.

The lower edges of electrode 21 are virtually all in contact with the lower interior surface of case 10, and form an electrical connection therewith. Therefore, the electrical case 10 becomes the negative terminal of the cell. Case 10 is isolated from electrical contact with any of the top conductive components by virtue of insulating ring 30 and insulating ring 32. Insulating ring 32 captures top cover 70, and vent plate 50 within its interior flange 33, and a tight seal is formed along the inner flange 33 by virtue of a machining operation which is performed at the time of construction of the cell. The machining operation consists of a circumferential squeezing of the outer case 10 to form the groove 12, and to flatten the upper edge of top flange 11 as shown in FIG. 2. The resulting seal is typically sufficiently tight so as to prevent any electrolyte from within the battery cell to escape to the outside.

Figure 3:
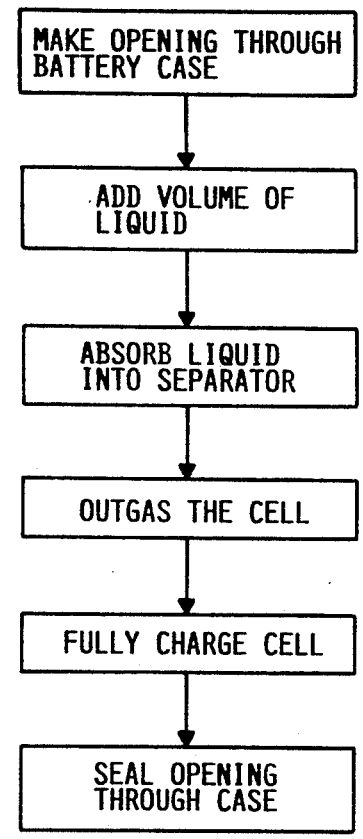
FIG. 3 shows a flow chart of the steps of the process described herein.

A safety valve mechanism is typically built into the cell by forming a raised opening 52 in vent plate 50. A rubber plug 60 is positioned in sealing relationship over this opening, and rubber plug 60 is compressed against the opening 52 by contact with the lower surface of the outer cover 70. Outer cover 70 typically has at least one vent hole 72 therethrough, which permits the passage of gas between the external environment of the cell and the small chamber formed between the inside walls of outer cover 70 and the outside walls of vent plate 50. If sufficient pressure develops in the interior of the cell, the rubber plug 60 may become deformed and compressed sufficiently far so as to permit the escape of pressurized gases from the cell interior to the external environment via openings 72. This safety valve feature is typically provided in rechargeable batteries so as to prevent possible explosions which might otherwise occur under conditions of extreme charge and/or discharge current in the cell. The charging and discharging of the cell inherently develops internal heat, and the amount of the heat is proportional to the magnitude of the current drain or charge which the cell experiences. Under excessive conditions this heat can build up to the point where the safety valve is released, thereby permitting the escape of electrolyte and gases from the interior of the cell to relieve the pressure. The process of this invention is shown in FIG. 3, and with reference to FIG. 2.

According to the first step of the process, a hole is made through the outer case 10 of the battery. A preferred location for this hole is shown in FIG. 2, although the hole may be made radially through the casing and the interior cell electrodes at other positions along the elevation of the battery. It is important that the hole be relatively small in diameter, and it has been found that a hole of approximately 0.020 inches (20 mils) is adequate for the purposes of the process. The hole is preferably made by a drilling operation, but alternatively could be made by a laser cutting technique or similar operation. One reason for requiring a relatively small hole at this step of the process, is to facilitate the sealing of the hole at a later step in the process. It has been found that relatively high internal pressures can be built up inside the cell, approximating 150 pounds per square inch (psi), and a smaller diameter hole is relatively easier to seal in a manner which will withstand these internal operating pressures.

The next step of the process is to inject a predetermined volume of electrolyte material into the cell through the hole drilled through the case. The volume of electrolyte to be injected typically represents about 30% of the capacity of the cell to hold electrolyte, and in the case of the particular Ni-Cd batteries disclosed herein this volume is approximately 0.7 cubic centimeters (cc) of electrolyte. It has been found that a KOH solution of about 21% KOH by weight is sufficient for the injected electrolyte. It has also been found that in some cases water may be injected into the cell, but the injection of water does not generally produce as satisfactory a final result as the injection of KOH. In the preferred embodiment, the injection step is accomplished by use of a surgical syringe and 16 mil needle, wherein the KOH is forcibly injected into the central region of the cell. An alternative approach could use a vacuum technique, such as the technique of placing one or a group of cells in a vacuum chamber and immersed in KOH solution. A partial vacuum may then be drawn from the chamber, and when the vacuum is removed the cell will absorb a volume of KOH proportional to the amount of vacuum originally applied to the chamber.

The next step of the process is to permit the injected electrolyte to become absorbed into the separator material between the electrodes in the cell. Because the electrodes in the separator material are tightly compressed in the form of a helical coil in the cell, the absorption step may require an extended period of time to assure that the electrolyte is substantially completely absorbed into the cell. In experiments which have been performed on the particular type of batteries disclosed herein, it has been found that the cells should be permitted a time period of 10–11 days for absorption to occur, and the range of time which has been found to provide some acceptable results is a time period from 6–14 days. It has also been found that during the time interval when absorption takes place, it is preferable to periodically shift the battery position so that during a portion of the absorption cycle the battery may be laid on one of its sides and then flipped over to lay on its other side during the remaining portion of the cycle, or alternatively the battery may be shifted a number of times during the cycle. Of course, the drilled opening through the battery should not be permitted to rest vertically downward so as to cause leakage from the cell, but the opening may be horizontally directed on one side or the other.

The next step of the process is to remove interior gases from the cell, which in the preferred embodiment is done by subjecting the cell to a number of voltage charge/discharge cycles while the opening through the cell case remains unsealed. In the preferred embodiment, three charge/discharge cycles have been found suitable for this purpose, wherein the battery is fully charged at a 600 milliamp charging rate during the charge cycle, and fully discharged at a 600 milliamp discharge rate during the charge cycles. It is thought that the repeated charge/discharge cycles may have the affect of outgasing the cell, because each cycle creates heat within the battery, and the heat distribution should be more or less evenly spread across the surface area of the respective electrodes; this distributed heating may very well force gas accumulations adjacent the electrode surfaces to migrate outwardly through the drilled opening, ultimately improving the electrolyte to electrode wetting and thereby improving the efficiency of the cell to generate current. The outgasing of the cells is believed to be quite an important step in the process because of the reasons described earlier herein. Alternative and/or additional process steps may further contribute to the outgasing success, as for example by subjecting the battery cells to a vacuum chamber for a period of time, interior gas buildup may be forced from the cell interior. It may also be helpful to subject the cell to repeated charge/discharge cycles while the cell is placed in a partial vacuum, to obtain the dual benefit of the pressure differential caused by the partial vacuum and the internal heat buildup caused by the charge/discharge cycles. After this step has been completed, it may be necessary to partially refill the electrolyte into the cell interior, as some of the electrolyte may also be removed during the outgasing process.

After the repeated charge/discharge cycles have been completed, one final charge is applied to the battery to place the battery in a fully charged condition. After this step has been completed, the hole through the outer case 10 is sealed. A preferred sealing technique has been found to be soldering, wherein a bismuth-lead solder has been selected for the operation. Bismuth-lead solder has a melting point of approximately 138° C., and therefore a relatively tight seal can be formed without subjecting the battery case to excessive temperatures.

After the battery has been fully sealed, it may then be returned to service, and experiments have shown that a spent battery processed according to this method has been returned to a fully-operational status, wherein it may be returned to a useful life comparable to the life of the original battery cell.

In a typical battery-pack arrangement, wherein six or more cells are wired into a battery pack in series electrical configuration, the process may be simultaneously applied to all of the battery cells in the pack, by subjecting each of the cells to the respective process steps disclosed herein. In tis case, it has been found preferable to turn the battery pack about its axis about once a day in order to facilitate the absorption step. Of course, the charge/recharge cycles are simultaneously applied to all batteries in the battery pack, and at the completion of the process all of the cells are sealed according to the techniques described herein.

The present invention may be embodied in other, specific forms without departing from the spirit or essential attributes thereof, and it is, therefore, desired that the present embodiment be considered in all respects as illustrative and not restrictive, reference being made to the appended claims rather than to the foregoing description to indicate the scope of the invention.

What is claimed is:

1. A method of reactivating a spent electrolyte battery cell comprising a top and an outer case enclosing a cell interior having an original electrolyte capacity, and an electrode projecting from the top of the cell, comprising the steps of:
   a) forming an opening into the cell interior and through the outer case of the cell;
   b) injecting a volume of electrolyte into the opening;
   c) absorbing the injected electrolyte into the cell interior for at least six days;
   d) removing accumulated gases from the cell interior by subjecting the cell to repeated substantially equal electrical charge/discharge cycles; and
   e) sealing the opening through the outer case of the cell.

2. The method of claim 1, wherein the number of charge/discharge cycles is at least three.

3. The method of claim 2, wherein the step of injecting further comprises injecting about 30% of the cell's original electrolyte capacity.

4. The method of claim 1, wherein the step of forming an opening further comprises drilling.

5. The method of claim 4, wherein the step of drilling further comprises drilling a hole of approximately 0.020 inch in diameter.

6. The method of claim 5, wherein the step of drilling further comprises drilling through the cell case at a location substantially near the top of the cell.

7. The method of claim 6, wherein the hole is drilled substantially to the center of the cell interior.

8. The method of claim 1, wherein the step of absorbing further comprises periodically turning the cell.

9. The method of claim 8, wherein the step of absorbing further comprises absorbing for a period in the range of 6-14 days.

10. The method of claim 9, wherein the absorbing step comprises about ten days.

11. The method of claim 1, wherein the step of sealing the cell further comprises filling the opening through the outer case with solder.

12. The method of claim 11, wherein the step of sealing further comprises soldering with a bismuth-lead solder.

13. The method of claim 1, wherein the step of injecting further comprises injecting with a water solution.

14. The method of claim 1, wherein the step of injecting further comprises injecting with a potassium hydroxide solution.

15. The method of claim 14, wherein the potassium hydroxide solution further comprises about 21% potassium hydroxide by weight.

16. A method of reactivating a spent electrolyte battery cell having an outer case and an interior, comprising the steps of forming an opening into the cell interior; injecting a quantity of electrolyte liquid into the cell interior; absorbing the electrolyte liquid into the cell interior; repeatedly electrically charging and discharging the cell at substantially equal rates, and sealing the opening formed in the first step.

17. The method of claim 16, wherein the step of electrically charging and discharging further comprises at least three charging cycles and at least two discharging cycles.

18. The method of claim 17, wherein the step of absorbing further comprises holding the cell for a time period.

19. The method of claim 18, wherein the time period is in the range of 6-14 days.

* * * * *